United States Patent
Zhang et al.

(10) Patent No.: US 12,087,008 B2
(45) Date of Patent: *Sep. 10, 2024

(54) USER ANALYTICS USING A CAMERA DEVICE AND ASSOCIATED SYSTEMS AND METHODS

(71) Applicant: NEX Team Inc., San Jose, CA (US)

(72) Inventors: Qi Zhang, Tseung Kwan O (HK); Wing Hung Chan, Kowloon (HK); Keng Fai Lee, Cupertino, CA (US); Long Mak, Shatin (HK)

(73) Assignee: NEX Team Inc., San Jose, CA (US)

(*) Notice: Subject to any disclaimer, the term of this patent is extended or adjusted under 35 U.S.C. 154(b) by 63 days.

This patent is subject to a terminal disclaimer.

(21) Appl. No.: 17/326,341

(22) Filed: May 21, 2021

(65) Prior Publication Data
US 2021/0272312 A1 Sep. 2, 2021

Related U.S. Application Data

(63) Continuation of application No. 17/124,520, filed on Dec. 17, 2020, now Pat. No. 11,024,053.
(Continued)

(51) Int. Cl.
*G06T 7/70* (2017.01)
*G06T 5/20* (2006.01)
(Continued)

(52) U.S. Cl.
CPC .............. *G06T 7/70* (2017.01); *G06T 5/20* (2013.01); *G06T 5/70* (2024.01); *G06T 7/20* (2013.01);
(Continued)

(58) Field of Classification Search
CPC .. G06T 7/70; G06T 5/002; G06T 5/20; G06T 7/20; G06T 7/50; G06T 7/60;
(Continued)

(56) References Cited

U.S. PATENT DOCUMENTS 5,563,988 A 10/1996 Maes et al.
11,003,918 B1* 5/2021 Datar .................. G06V 20/52
(Continued)

OTHER PUBLICATIONS

Osama Mazhar, "Vision-based Human Gestures Recognition for Human-Robot Interaction", Available at: https://tel.archives-ouvertes.fr/tel-02310606v3, Feb. 12, 2020, pp. 1-123.

*Primary Examiner* — Jose L Couso
(74) *Attorney, Agent, or Firm* — American Patent Agency PC; Daniar Hussain; Stephen M. Hou

(57) ABSTRACT

Methods and systems for performing location and movement determination in a three-dimensional environment using a device with a camera are disclosed. The methods and systems perform the steps of capturing an image of a user using the camera of the computing device, identifying the user from the image using a first algorithm, determining a first physical information associated with the user using a first algorithm, determining a second physical information of the user based on the first physical information and an input parameter of the user using a search process, and determining the location of the user in the environment based on the first physical information and the second physical information.

15 Claims, 9 Drawing Sheets

Related U.S. Application Data

(60) Provisional application No. 62/975,710, filed on Feb. 12, 2020, provisional application No. 62/950,949, filed on Dec. 20, 2019.

(51) Int. Cl.
*G06T 5/70* (2024.01)
*G06T 7/20* (2017.01)
*G06T 7/50* (2017.01)
*G06T 7/60* (2017.01)
*G09B 19/00* (2006.01)

(52) U.S. Cl.
CPC .................. *G06T 7/50* (2017.01); *G06T 7/60* (2013.01); *G09B 19/0038* (2013.01); *G06T 2207/20081* (2013.01); *G06T 2207/30196* (2013.01)

(58) Field of Classification Search
CPC . G06T 2207/20081; G06T 2207/30196; G06T 2207/20084; G06T 7/536; G06T 7/73; G06T 7/85; G06T 13/20; G06T 13/40; G06T 15/00; G06T 17/00; G06T 17/20; G06T 17/30; G06T 2207/30244; G06T 3/4046; G06T 9/002; G09B 19/0038; G06N 3/0454; G06N 7/005; G06N 7/02; G06N 20/10; G06N 3/02; G06N 3/08–088; G06N 3/0445; G06N 7/00; G06N 20/00; G06K 9/6232; G06K 9/6251; G06K 7/1482; G06V 10/7715; G06V 30/19127; G06V 10/462; G06V 20/41; G06V 20/64; G06V 40/10; G06V 40/113; G06V 10/454; G06V 10/82; G06V 30/18057; G06F 3/017; G06F 3/0304; G06F 3/0425

See application file for complete search history.

(56) References Cited

U.S. PATENT DOCUMENTS

| | | | | |
|---|---|---|---|---|
| 11,023,740 B2* | 6/2021 | Mirza | ..................... | G06V 10/44 |
| 11,023,741 B1* | 6/2021 | Dalal | ..................... | G06T 7/292 |
| 11,030,756 B2* | 6/2021 | Crain | ..................... | G01S 13/87 |
| 11,113,541 B2* | 9/2021 | Datar | ................... | G08B 13/19608 |
| 11,113,837 B2* | 9/2021 | Mirza | ..................... | G01G 19/52 |
| 11,301,691 B2* | 4/2022 | Mirza | ..................... | G06T 7/223 |
| 11,403,852 B2* | 8/2022 | Datar | ................... | G06V 10/764 |
| 11,423,657 B2* | 8/2022 | Datar | ..................... | G06V 40/28 |
| 11,450,011 B2* | 9/2022 | Wang | ................... | G06Q 20/203 |
| 11,501,454 B2* | 11/2022 | Mirza | ................... | G07G 1/0036 |
| 11,501,455 B2* | 11/2022 | Crain | ................... | G06Q 20/208 |
| 11,551,454 B2* | 1/2023 | Mirza | ..................... | G06T 7/80 |
| 11,557,124 B2* | 1/2023 | Mirza | ................... | G06V 10/82 |
| 11,587,243 B2* | 2/2023 | Crain | ..................... | G01S 17/46 |
| 11,674,792 B2* | 6/2023 | Jones | ................... | G01B 11/002 |
| | | | | 382/103 |
| 11,721,029 B2* | 8/2023 | Dalal | ..................... | G06V 20/52 |
| | | | | 382/103 |
| 11,721,041 B2* | 8/2023 | Mirza | ................ | G01G 19/4144 |
| 11,756,213 B2* | 9/2023 | Datar | ..................... | G06V 20/52 |
| | | | | 382/103 |
| 2012/0070070 A1 | 3/2012 | Litvak | | |
| 2013/0328762 A1* | 12/2013 | McCulloch | ............. | G06F 3/017 |
| | | | | 345/156 |
| 2014/0002444 A1* | 1/2014 | Bennett | ................. | G06T 19/006 |
| | | | | 345/419 |
| 2018/0075593 A1* | 3/2018 | Wang | ........................ | G06T 7/85 |
| 2019/0371028 A1* | 12/2019 | Harrises | ............. | G02B 27/0101 |
| 2020/0304375 A1* | 9/2020 | Chennai | ................. | G06T 17/05 |
| 2020/0364937 A1* | 11/2020 | Selbrede | ................... | G06T 7/70 |

* cited by examiner

USER ANALYTICS USING A CAMERA DEVICE AND ASSOCIATED SYSTEMS AND METHODS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of image processing and pertain particularly to methods and systems for determining user analytics such as user location and movement information by imaging users in a three-dimensional environment with a computing device, the computing device having one or more cameras for video capture.

BACKGROUND OF THE INVENTION

The statements in this section may serve as a background to help understand the invention and its application and uses, but may not constitute prior art.

In both professional and amateur sports, coaching can lead to the development of technical, tactical, physical and drill skills. Further, personalized and targeted training often help improve fitness and performance in a particular sport while reducing chances of injury. Advances in modern computing and networking technology have allowed virtual access to experienced coaches and effective performance training programs. Yet existing digital coaching and training applications may be passive in nature, where users or players are provided with instructions or drilling plans only, or function in an offline manner. In such offline processes, video recordings of players in action can be replayed, analyzed, and annotated, manually by a coach or the player, after a training or drill session is completed.

It is against this background that various embodiments of the present invention were developed.

BRIEF SUMMARY OF THE INVENTION

Some embodiments of the present invention include methods, systems, and apparatuses for determining user location and movement information using a computing device.

In various embodiments, a computer-implemented method is described for performing location and movement determination in a three-dimensional environment using a computing device having a camera. The method can include the steps of capturing an image of a user using the camera of the computing device, identifying the user from the image using a first algorithm, determining a first physical information associated with the user using a second algorithm, determining a second physical information associated with the user based on the first physical information and an input parameter of the user using a search process, and determining the location of the user in the environment based on the first physical information and the second physical information.

In some embodiments, the first physical information includes a pose of the user, and the second physical information includes a depth of the user with respect to the camera.

In other embodiments, the method further includes determining a movement associated with the user based on the first physical information.

In one embodiment, the method further includes determining a direction of gravity using the computing device, determining a second location of a portion of the user's body in the three-dimensional environment, and determining, based on the second location, a distance between the camera and the second location.

In some embodiments, the method further includes determining, based on the second physical information, a reference plane in the camera's coordinate system.

In other embodiments, the method further includes determining a first pose size of the user from a first user pose and determining a second pose size of the user from a second user pose, and determining a depth based on one or more of the camera's center, a distance to an imaging plane, an input height, the first pose size, and the second pose size. In an embodiment, the method can further include determining the first pose size based on a length of pose limbs associated with the first user pose.

In some embodiments, the first physical information includes noisy pose data, and the method further includes applying a filter to the noisy pose data, and determining a second location of the user based on the filtered noisy pose data, where the second location has a greater accuracy than the location.

Furthermore, a non-transitory storage medium is described for performing location and movement determination in a three-dimensional environment using a computing device having a camera. The storage medium includes machine-readable program code that cause a processor to capture an image of a user using the camera of the computing device, identify the user from the image using a first algorithm, determine a first physical information associated with the user using a second algorithm, determine a second physical information associated with the user based on the first physical information and an input parameter of the user using a search process, and determine the location of the user in the environment based on the first physical information and the second physical information.

In some embodiments, the first physical information includes a pose of the user, and the second physical information includes a depth of the user with respect to the camera.

In other embodiments, the program code can cause the processor to determine a movement associated with the user based on the first physical information. In some embodiments, the program code can cause the processor to determine a direction of gravity using the computing device, determine a second location of a portion of the user's body in the three-dimensional environment, and determine, based on the second location, a distance between the camera and the second location. In an embodiment, the program code can cause the processor to determine, based on the second physical information, a reference plane in the camera's coordinate system.

In some embodiments, the program code can cause the processor to determine a first pose size of the user from a first user pose and determine a second pose size of the user from a second user pose, and determine a depth based on one or more of the camera's center, a distance to an imaging plane, an input height, the first pose size, and the second pose size.

In another embodiment, the first physical information includes noisy pose data, and the program code can cause the processor to apply a filter to the noisy pose data and determine a second location of the user based on the filtered noisy pose data, where the second location has a greater accuracy than the location.

Finally, a computing device for performing location and movement determination in a three-dimensional environment is described. The computing device can include a camera device, a processor, and a non-transitory memory storing program code thereon. The program code can be executable by the processor to capture an image of a user using the camera device of the computing device, identify the user from the image using a first algorithm, determine a first physical information associated with the user using a second algorithm, determine a second physical information associated with of the user based on the first physical information and an input parameter of the user using a search process, and determine the location of the user in the environment based on the first physical information and the second physical information.

In some embodiments, the first physical information includes a pose of the user, and the second physical information includes a depth of the user with respect to the camera.

In other embodiments, the program code can be executable by the processor to determine a direction of gravity using the computing device, determine a location of a portion of the user's body in the three-dimensional environment, and determine, based on the location, a distance between the camera and the location. In an embodiment, the program code can be executable by the processor to determine, based on the second physical information, a reference plane in the camera's coordinate system. In other embodiments, the program code can be executable by the processor to determine a first pose size of the user from a first user pose and determining a second pose size of the user from a second user pose, and determine a depth based on one or more of the camera's center, a distance to an imaging plane, an input height, the first pose size, and the second pose size.

In various embodiments, a computer program product is disclosed. The computer program may be used for facilitating location and movement determination in a three-dimensional environment using a camera of a computing device and may include a computer-readable storage medium having program instructions, or program code, embodied therewith, the program instructions executable by a processor to cause the processor to perform the steps described herein.

In various embodiments, a system is described, including a memory that stores computer-executable components; a hardware processor, operably coupled to the memory, and that executes the computer-executable components stored in the memory, wherein the computer-executable components may include components communicatively coupled with the processor that execute the steps described herein.

In another embodiment, the present invention includes a non-transitory, computer-readable storage medium storing executable instructions or program code, which when executed by a processor, causes the processor to perform a process for facilitating location and movement determination in a three-dimensional environment using a camera of a computing device, the instructions causing the processor to perform the steps described herein.

In another embodiment, the present invention includes a system for facilitating location and movement determination in a three-dimensional environment using a camera of a computing device, the system comprising a user device or a computing device having a two-dimensional camera, a processor, a display, a first memory; a server comprising a second memory and a data repository; a telecommunications-link between said user device and said server; and a plurality of computer codes embodied on said first and second memory of said user-device and said server, said plurality of computer codes when executed causes said server and said user-device to execute a process comprising the steps described herein.

In yet another embodiment, the present invention includes a computerized server comprising at least one processor, memory, and a plurality of computer codes embodied on said memory, said plurality of computer codes when executed causes said processor to execute a process comprising the steps described herein.

Yet other aspects of the present invention include methods, processes, and algorithms comprising one or more of the steps described herein, and also include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Figure 1:
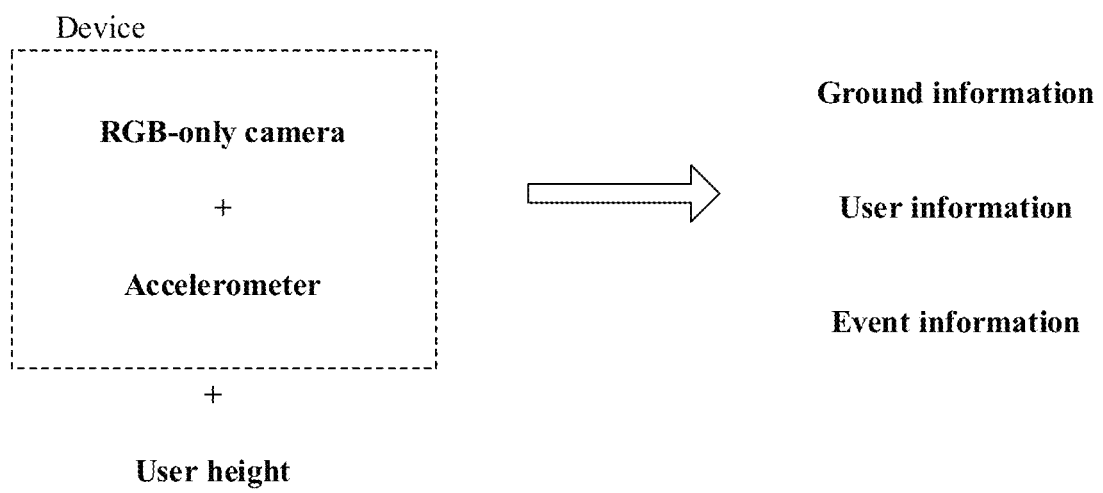
FIG. 1 is an exemplary schematic diagram of an overview of information generated by the device for determining a user's location and movements in an environment, in accordance with example embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

NEX, NEX TEAM, and HOMECOURT are trademark names carrying embodiments of the present invention, and hence, the aforementioned trademark names may be interchangeably used in the specification and drawings to refer to the products/services offered by embodiments of the present invention. The term NEX, NEX TEAM, or HOMECOURT may be used in this specification to describe the overall user location and movement determination system, as well as the company providing said system. With reference to the figures, embodiments of the present invention are now described in detail.

Introduction and Overview

Broadly, embodiments of the present invention relate to image processing and pertain particularly to methods and systems for user location and movement determination for use, for example, in connection with physical activities, training, and sport games of users, using a mobile computing device having one or more on-device cameras, by deploying artificial intelligence (AI)-based processes such as computer vision techniques.

It would be understood by persons of ordinary skill in the art that training, or performance training activities, discussed in this disclosure broadly refer to any physical exercise, workout, drill, or practice that improve a user's fitness and skill levels to better his or her ability to perform a given physical activity or sport. Training activities thus disclosed can maintain, condition, correct, restore, strengthen, or improve the physical ability, power, agility, flexibility, speed, quickness, reaction, endurance, and other physical and technical skills necessary for a physical activity or sport. Such a physical activity or sport may be competitive or non-competitive in nature, with or without specific goals or challenges, and may or may not be scored according to specific rules. A user of the system as disclosed herein may also be referred to as a player, including in non-competitive activities such as rehabilitative physical therapies and occupational therapies. A training session may involve one or more individual players. During a training session, individual skills such as power, speed, agility, flexibility, posture, balance, core strength, upper and lower-body strength, rhythm, swing, stroke, flick, running, stopping, dribbling, juggling, passing, catching, throwing, smashing, tackling, shooting, jumping, sprinting, serving, and goalkeeping may be isolated, broken down into specific movements, and worked upon. Such skills may be inter-dependent. For example, better core strength may lead to better stance and balance, and better body-eye and hand-eye coordination may lead to faster speed, shorter stopping time, and better control of a ball. Some training activities are tailored for specific demands of a particular sport. Embodiments of the present invention may be used for interactive virtual coaching in ball sports as well as other types of sports or physical activities, including but not limited to, basketball, soccer, baseball, football, hockey, tennis, badminton, juggling, archery, softball, volleyball, boxing, canoeing, kayaking, climbing, cycling, diving, equestrian, fencing, golf, gymnastics, handball, judo, karate, modern pentathlon, roller sport, rowing, rugby, sailing, shooting, swimming, surfing, table tennis, taekwondo, track and field, triathlon, water polo, weightlifting, wrestling, squash, wakeboard, wushu, dancing, bowling, netball, cricket, lacrosse, running, jogging, yo-yo, foot bagging, hand sacking, slinky, tops, stone skipping, and many other types of sports, games, and other activities in a similar fashion.

As noted, coaching is employed in many sports and games in order to improve the performance of players. Real-time analytics systems have been developed to provide quantitative and qualitative game and player analytics, with uses in broadcasting, game strategizing, and team management, yet mass mainstream usage of such systems by individual players for customized performance training may be, in many situations, complex and expensive. Real-time tracking technology based on image recognition may often require use of multiple high-definition cameras mounted on top of a game area or playfield for capturing visual data from multiple camera arrays positioned at multiple perspectives, calibration for different environments, and massive processing power in high-end desktop and/or server-grade hardware to analyze data from the camera arrays. Accurate tracking of player motion and forms, and real-time automated analysis require vast computational resources that hinder implementations with low-cost, general-purpose hardware with small form factors.

Such real-time analytics systems may need to determine various location and movement information associated with users (e.g., players of a game). Therefore, the disclosed systems advance the state of the art at least with respect to determining user location and movement information by imaging users in a three-dimensional environment using just a mobile device by utilizing video data captured from a camera on the mobile device.

More specifically, in one aspect, embodiments of the virtual coaching system disclosed herein relate to providing user location and movement determination, tracking and analysis of player movements using one or more computer vision algorithms running on a mobile computing device such as a smartphone, tablet, or laptop, and optionally providing audio or visual feedback based on the movement analysis, in real-time or near real-time.

In various embodiments, computer vision techniques such as image registration, motion detection, background subtraction, objection tracking, three-dimensional reconstruction techniques, cluster analysis techniques, camera calibration techniques such as camera pose estimation and sensor fusion, and modern machine learning techniques such as convolutional neural network (CNN), may be selectively combined to perform high accuracy analysis in real-time on the mobile device. The limited computational resources in a mobile device present a unique challenge. For instance, a smartphone's limited CPU processing power can be heat-sensitive. A CPU clock rate may be reduced by the operating system (OS) whenever the phone heats up. Also, when a system consumes too much memory, the system or application running on the system may be terminated by the OS. In some embodiments, the amount of battery that the user location and movement determination system consume is controlled, otherwise the limited battery on a smartphone may not last a given duration (e.g., duration of a whole training session).

In general, as used herein, the term analytics can refer to meaningful patterns (e.g., from a human perspective or from the perspective of a computer algorithm or machine learning module), knowledge, and information from data or statistics. As used in this disclosure, user or player analytics can refer to quantitative and qualitative characterizations of player actions during one or more training sessions. Further, the terms player and user may be used interchangeably in many of the various embodiments described herein. In various aspects, the user location and movement determinations and information derived therefrom can be used downstream to perform analytics and provide feedback to users. For example, for a ball sport game, player analytics include but are not limited to, shot types, shot make/miss determinations, shot score, player movement patterns, player moving speed, moving direction, reaction time, jump height and type, jump foot, landing foot, shot release time and angle, and posture statistics such as body bend angle, body rotation, leg bend ratio, leg power, combinations thereof, and/or the like. In some examples, the term analytic may refer to both a shot analytic specific to a given shot attempt, and a player analytic specific to an identified player. In addition, as used herein, the term game analytics can generally refer to statistical analytics generated from player analytics and optionally, can refer to shot analytics over the duration of a game. Further, the term team analytics can refer to analytics aggregated across players of a team.

As used in connection with certain embodiments of the disclosure, player analytics and/or metrics can be specific to different types of sports. For instance, in an illustrative basketball dribbling training example, one or more users may be able to perform a dribbling workout, and an application on a mobile computing device implementing an embodiment of the present disclosure may be configured to monitor the dribbling workout to determine dribble speed, dribble accuracy, ability of the user to make specific movements during dribbling, combinations thereof, and/or the like.

As noted, the physical activities and/or sports being trained for can include, but not be limited to, any suitable type of physical games played in the real world, such as on a court, field, trail, and/or the like. Further, interactivity with a virtual and/or augmented world provides training opportunities for specific skills and techniques and physical activities and/or sports that at least partially interface with such domains and accordingly, the disclosed systems can be configured to operate within such domains. In some embodiments, another level of interactivity may exist among one or more users linked through a network, where multiple users or players may train together at the same time, and training results may be compared across time. Accordingly, the disclosed systems can be configured to operate with group activities with multiple users, which may not necessarily have to be collocated or performing one or more activities (e.g., training sessions, games, drills, etc.) at substantially the same time.

Exemplary Embodiments for Three-Dimensional Imaging and Data Processing

In various aspects, embodiments of the disclosure are directed to using a device (e.g., mobile device, tablet, laptop, wearable device, and/or the like) to determine the location of one or more users and associated movements and/or movement patterns (e.g., jumps, squats, stretches, weightlifting movements, combinations thereof, and/or the like). Further, the disclosed systems can determine the location of user(s) and associated movements over a predetermined time interval in a three-dimensional environment.

FIG. 1 shows an exemplary schematic diagram 100 that illustrates an overview of at least some information generated by the device for determining a user's location and movements in an environment, in accordance with example embodiments of the present invention. In some embodiments, the device can include a camera. The camera can be an RGB-based camera, that is, a camera equipped with a standard complementary metal-oxide semiconductor (CMOS) based sensor device through which the colored images of persons and objects can be acquired via color-sensitive (e.g., red, green, and blue sensitive) sensor arrays. In some examples, the camera can include various intrinsic parameters (e.g., focal length, image sensor format, principal point, lens distortions, and/or the like associated with the camera), and the disclosed systems can be configured to modify one or more of such parameters to obtain images and videos of the users and/or objects for analysis. In additional embodiments, the device can include various sensors, such as an accelerometer, a location-determination unit (e.g., including, but not limited to, a lidar-based sensor, a Global positioning system (GPS) based sensor, etc.), and/or the like.

In some embodiments, the device can obtain data generated by the camera and/or one or more sensors (e.g., an accelerometer) of the device, and combined with information about the user (e.g., the height of the user, a weight of a user, a color of a user's clothing or skin, or any other physically relevant information associated with the user) and can determine, based at least in part on the obtained data, additional information related to an environment of the user and/or objects of interest in the environment, the user and/or objects themselves, and/or movements of the user and/or objects. While the disclosure may, in various sections and described embodiments, reference the location and movements of users in the environment, it is understood that similar descriptions would allow the determination of location and movements associated with one or more objects (e.g., balls, goal posts, training equipment, weights, combinations thereof, and/or the like) in the environment as well, even if not explicitly described. Further, in some examples, the disclosed systems can be configured to determine the additional information that can include, but not be limited to: (i) information about the ground of the environment including the three-dimensional location of various points on the ground of a certain environment, (ii) the three-dimensional location of the user and/or objects, (iii) the speed associated with and/or distance traveled by the user and/or objects, and/or (iv) event information which can represent user's movement events (e.g., jumping, squatting, shooting, dancing, weight lifting, running, and/or the like) and information associated with the user's movement events (e.g., height of jump, degree of squats, acceleration and/or speed of sprint, accuracy of shooting, combinations thereof and/or the like).

In some examples, the device can be initialized and configured (e.g., calibrated) as follows to make the determinations described above. In some examples, the device may be positioned in a predetermined manner (e.g., affixed to a tripod, and/or positioned to be lying at an angle on a surface such as a table). In such a position and configuration, the device may be maintained in a stationary position for at least a predetermined period of time during the measurement process. For example, in some embodiments, a camera associated with the device may be maintained in a position such that the camera points in a forward direction (e.g., as opposed to a downwards or upwards direction) with respect to the user (e.g., the normal vector can be defined with respect to the surface of the camera that can point substantially in the direction of the user). In further aspects, the camera may be positioned such that a predetermined portion of the ground of the environment is visible by the camera of the device. In another embodiment, the device may be maintained in the position for a predetermined duration (e.g., several seconds, minutes, etc.) such that a user can be positioned (e.g., stand or assume any suitable position such as a position associated with a training session) in front of the camera associated with the device, for example, to perform an initial setup and calibration of the device and camera. In particular, in some examples, the user may need to be in a predetermined position in order to perform a calibration of the disclosed systems beyond a predetermined threshold of accuracy. For example, the disclosed systems can request that the user stands straight such as the user's head and/or feet are visible and imaged by the camera. Based at least in part on the initialization and calibration of the device and associated camera by performing at least some of the steps described above, the device can track the location and movements of the user, and the user can perform various activities (e.g., play a game or sport, train, etc.).

In various embodiments, some example activities performed by the user can include, but not be limited to, the user standing, walking, running, squatting, jumping, and/or the like in an area (e.g., game area, field, or court) which is visible and actively being imaged by the camera of the device. The disclosed systems can thereby detect the user's location, moving speed and/or velocity, acceleration, and total travel distance. Further, the disclosed systems can, in addition, determine various user initiated or associated events such as a user performing a squatting motion, a jump motion, a given pose, a shot attempt, etc. and can determine information associated with said user events, such as a height of jump, a degree of a squat, and/or the like.

In various embodiments, the disclosed systems can use the determination of various events and/or information associated with the events to further determine a parameter that represents a score characterizing a user's performance of a given activity (e.g., for training and/or coaching purposes). For example, the disclosed systems can determine a speed score, an agility score, and/or explosiveness score associated with the user's performance of a motion associated with the event. In some non-limiting examples, the disclosed systems described herein can be used to determine user performance metrics (e.g., speed, agility, power, acceleration, accuracy, explosiveness, combinations thereof, and/or the like) while performing an activity such as a shuttle run activity associated with a sport such as basketball and/or a lane agility drill associated with basketball training.

In one embodiment, the disclosed systems can be used to track, monitor, and/or record the fitness activity of a user or a group of users. For example, the disclosed systems can determine and/or record the user's fitness effort over a predetermined interval of time (e.g., days, weeks, months, or the like). In particular, the system can determine the user's fitness effort by tracking the user's locations and movement and calculating the fitness effort based on at least these parameters. For example, the disclosed systems can record the moving distance and speed of the user and can use this information to estimate the calories used by the user. Accordingly, effort can refer to the user's total moving distance, the total burned calories by the user, or the like. As further examples, the disclosed systems can determine the user's effort by determining a step count or a count of a certain movement pattern performed by the user which can be tracked based on a user's pose or movement. Further, such data determined by the disclosed systems can be used to further guide users to perform a given fitness activity in a more accurate and/or improved manner, for example, under the supervision of a coach or other regulating entity. In particular, the disclosed systems can allow the coach (or regulating entity) to view the user's performance of the activities over time to determine changes needed to improve the user's performance of said activities, and the disclosed systems can further be used as a means to communicate such information from the coach (e.g., via messages, audio, and/or video instructions conveyed to the user via an application associated with the disclosed systems). In another embodiment, the disclosed systems can be used in connection with an activity that involves the detection and/or determination of a user's motion (e.g., a motion sensing game). For example, the disclosed systems can use a user's physical position and/or movements in order to provide input to a video game to control the video game. The above examples are merely illustrative and should not be considered to limit the applications of the disclosed systems as understood by one of ordinary skill in the art.

Implementation Details

Figure 2:
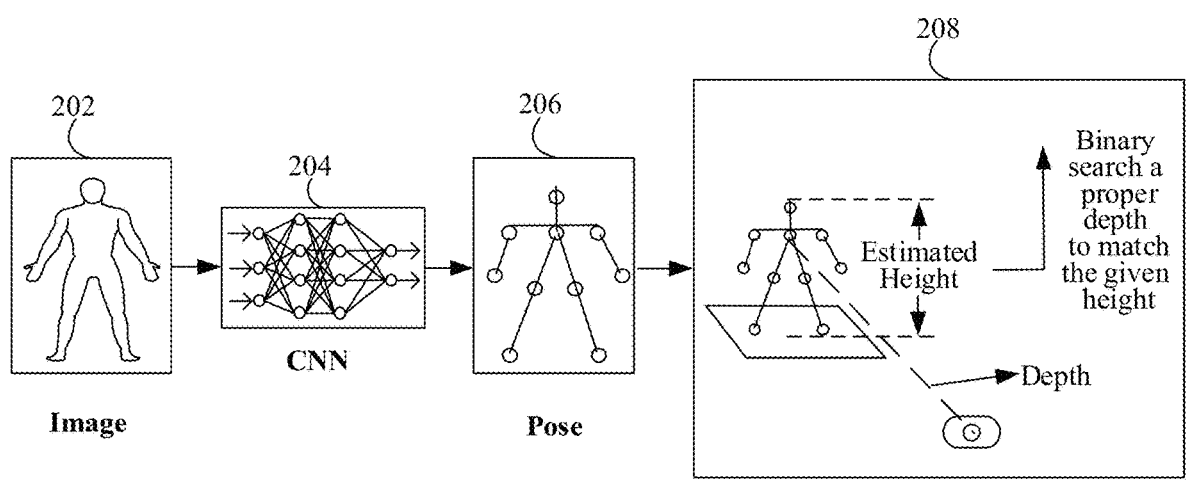
FIG. 2 is an exemplary schematic diagram illustrating the use of machine learning algorithms and machine vision algorithms for determining a user's height and depth with respect to a camera in an environment, in accordance with example embodiments of the present invention.

FIG. 2 is an exemplary schematic diagram 200 illustrating the use of machine learning algorithms and machine vision algorithms for determining a user's height and depth with respect to the camera in an environment, in accordance with example embodiments of the present invention.

In particular, the disclosed systems can capture images 202 using the camera of the device (e.g., mobile phone), input at least a portion of the images to a machine-learning algorithm 204 (e.g., which can implement any suitable algorithm including, but not limited to, a convolutional neural network, CNN or the like), and extract a user's pose 206 using, for example, an algorithm such as a predetermined machine-vision algorithm (e.g., a pose estimation algorithm). Further, as illustrated in diagram 208, the disclosed systems can use two or more of the camera's intrinsic parameters (which can be known based on the specifications of the camera), the direction of gravity using the accelerometer of the device, two-dimensional (2D) pose data representing one or more key points of the image(s), and the depth of the user (e.g., the distance from the camera's center to the user's plane, assuming the user is on a plane in the three-dimensional world), to determine the real-world height of a given user as will be further described herein. Further, the disclosed systems can determine the depth data by any suitable technique, such as binary searching the depth of the user's position to match the given real-world height of the user, as described further below. As a result of one or more of the operations described above, the disclosed systems can determine the depth of the user, which can represent the real-world distance from the camera to the user.

As noted above, the disclosed systems can perform a binary search process to determine a depth of the user from the mobile computing device. In particular, the disclosed systems can first estimate the depth of the user (e.g., the disclosed system can estimate a depth having a value of D). In some embodiments, the disclosed systems may not initially know the user's depth but may compute the user's depth as an output based on an input of the user's height. Further, the disclosed systems can perform the determination of the user's depth by first randomly predicting a depth, then using the predicted depth to compute a corresponding height of the user, and then compare the computed height with user's actual height. If the computed height is determined to be too large with respect the user's actual height, the disclosed systems can be configured to interpret the predicted user's depth as being too large, and accordingly, the disclosed systems can reduce the predicted user's depth and predicting and checking against the user's height. This process can be referred to as a binary search process, which can lead the disclosed systems to a more and more accurate guessed depth with increasing the prediction/checking iterations.

Further details of the above procedure follow. In particular, once the disclosed system makes the predicted estimate of the value of the depth D, the disclosed systems can determine whether the estimated depth D is larger or smaller than the user's actual depth based on the following procedure. If the disclosed systems determine that the estimated depth is too large compared to the actual depth, the disclosed systems can decrease the estimated depth accordingly by a predetermined incremental value, which can be dynamically modified based on user settings or algorithmic configuration. If, on the other hand, the disclosed systems determine that the estimated depth is too small compared to the actual depth, the disclosed systems can increase the estimated depth value by a predetermined incremental value. Moreover, the disclosed systems can continuously (and/or periodically) adjust the estimated depth until an optimal value of the depth is determined.

As noted, in some examples, the disclosed systems can verify whether the value of the estimated depth is too large or too small. If the disclosed systems perform an algorithm (described below) to compute the height H' of the user given the depth D, and the algorithm can ensure that the computed height H' of the user is monotonically increasing for increases in the value of the depth D. Thereafter, the disclosed systems can compare the computed height H' with the user's actual height H (which can represent a ground truth, provided, for example, by user input). Accordingly, if the value of H' is larger than H, the disclosed systems can determine that the estimated value of the depth D is too large. On the other hand, if the value of H' is less than H, the disclosed systems can determine that the estimated value of the depth D is too small.

In some embodiments, the algorithm the disclosed systems can use to compute the user's height H' based on an estimated depth D can include one or more of the following operations. In some examples, the disclosed systems may not necessarily simply use the estimated depth value D to compute the user's height. Rather, the disclosed systems may use at least some of the inputs described below to obtain the user's height H'. In particular, the disclosed systems may use a 2D human pose estimation result of at least one image of the user. Specifically, the disclosed systems can use the midpoint of two ears and the midpoint of two ankles of the user's pose estimation result to determine a first parameter associated with the user. In some examples, the disclosed systems may determine and use a second parameter associated with a user, namely the user's estimated chest point in addition to the midpoints of the user's ears and ankles. Accordingly, the disclosed systems can use at least the following parameters to determine the user's height: Pc—the chest point, Pe—the midpoint of two ears, and Pa—the midpoint of two ankles. In some examples, the disclosed systems can use camera intrinsic variable(s) (e.g., a focal length and/or a principal point of the camera) to determine the user's height. The disclosed systems can use one or more of the intrinsic variables (e.g., the principal point) to determine how various three-dimensional points in the user's environment are projected to a 2D image of the user and the user's environment. Accordingly, the disclosed systems can use the following variables: f—focal length and (cx, cy)—principal point in order to determine the user's height.

In some examples, the disclosed systems can use the depth of the user while the disclosed systems continue estimating the depth of the user during the binary search process described above. In this manner, the disclosed systems can continue to update the value of the user's depth (e.g., as the user moves, or as the user stands still so as to improve the accuracy of the depth determination). Further, in some examples, the disclosed systems may determine the depth as estimated from a first portion of the user's body (e.g., the user's chest) as opposed to a second portion of the user's body. In some examples, the disclosed systems can use a gravity direction associated with the camera coordinate system (e.g., gravity direction as obtained from the user's mobile device's accelerator readings). In particular, the disclosed systems can determine and use a variable g that can represent the three-dimensional vector of the gravity in the camera coordinate system, and the variable may be determined with respect to the position of the mobile device (e.g., updated as the mobile device moves and/or changes orientation).

In some embodiments, the disclosed systems aspects of the technique described above to determine the user's height based on one or more of the following operations. In particular, the algorithm can compute the three-dimensional location of the user's chest as follows. The disclosed system can use background knowledge (e.g., any 2D point on the image represents a ray in the three-dimensional space, the camera coordinate system). Mathematically, if the 2D point is (u, v), the three-dimensional ray is from (0, 0, 0)→(u−cx, v−cy, f), then given a chest depth D and the chest 2D image point Pc, the disclosed systems can locate the three-dimensional chest point as ((Pc.x−cx)*D/f, (Pc.y−cy)*D/f, D), where f is the focal length. In pose estimation, the chest key point can refer to the midpoint of the user's left and right shoulder key points. Further, the left and right shoulders' key points can respectively be defined as the rotational centers of the left and right shoulder joints.

In some examples, the disclosed systems can determine a user's plane that can represent an imaginary plane that can pass through the three-dimensional chest point associated with the user when the user is in a predetermined position with respect to the camera (e.g., the user is standing straight and facing the camera). The disclosed systems can determine a normal vector associated with the user's plane which can be used to represent the user's plane mathematically. As noted, the disclosed systems can determine the gravity vector g, and can determine that the gravity vector is parallel with the user's plane (e.g., because the user can be assumed to be standing straight). The disclosed systems can further determine that an x direction represented by a vector (1, 0, 0) in the camera coordinate system is parallel with the user's plane because the user can be in a predetermined orientation such as facing the camera. Accordingly, the disclosed systems can obtain the normal vector associated with user's plane by performing a cross product of vectors g and the vector (1, 0, 0) to obtain the normal vector.

The disclosed systems can compute the three-dimensional location of the user's ankle midpoint and ear midpoint. In particular, the disclosed systems can identify the user's plane via the normal vector which is determined from the chest three-dimensional point and the gravity vector described above. In some examples, a 2D point on an image of the user can be represented by a ray in a three-dimensional space representing the user's environment. In some embodiments, the disclosed systems can perform a ray-plane intersection to obtain the three-dimensional point location of a corresponding 2D image point, if the image point is the projection of a point on that three-dimensional plane. The disclosed systems can use the ray-plane intersection to determine the three-dimensional location of the ankle midpoint and ear midpoint because these points are approximately on the user's plane. As mentioned above, a 2D point on an image can be represented by a ray in a three-dimensional space. The ray can be determined from a point (e.g., a point representing a camera center) and a direction (e.g., a ray's direction computed from a 2D point).

The disclosed systems can compute an estimate of the user's height. From the operations described above, the disclosed systems can determine the three-dimensional location of user's ankle midpoint and ear midpoint. Accordingly, the three-dimensional distance between these two points can be multiplied with a constant (e.g., 1.16) to approximate the height of the user. Such an approximation may introduce a relatively small error (e.g., about a 0~2% error) on the user's depth that the disclosed systems estimate from the user's height estimate.

Figure 3:
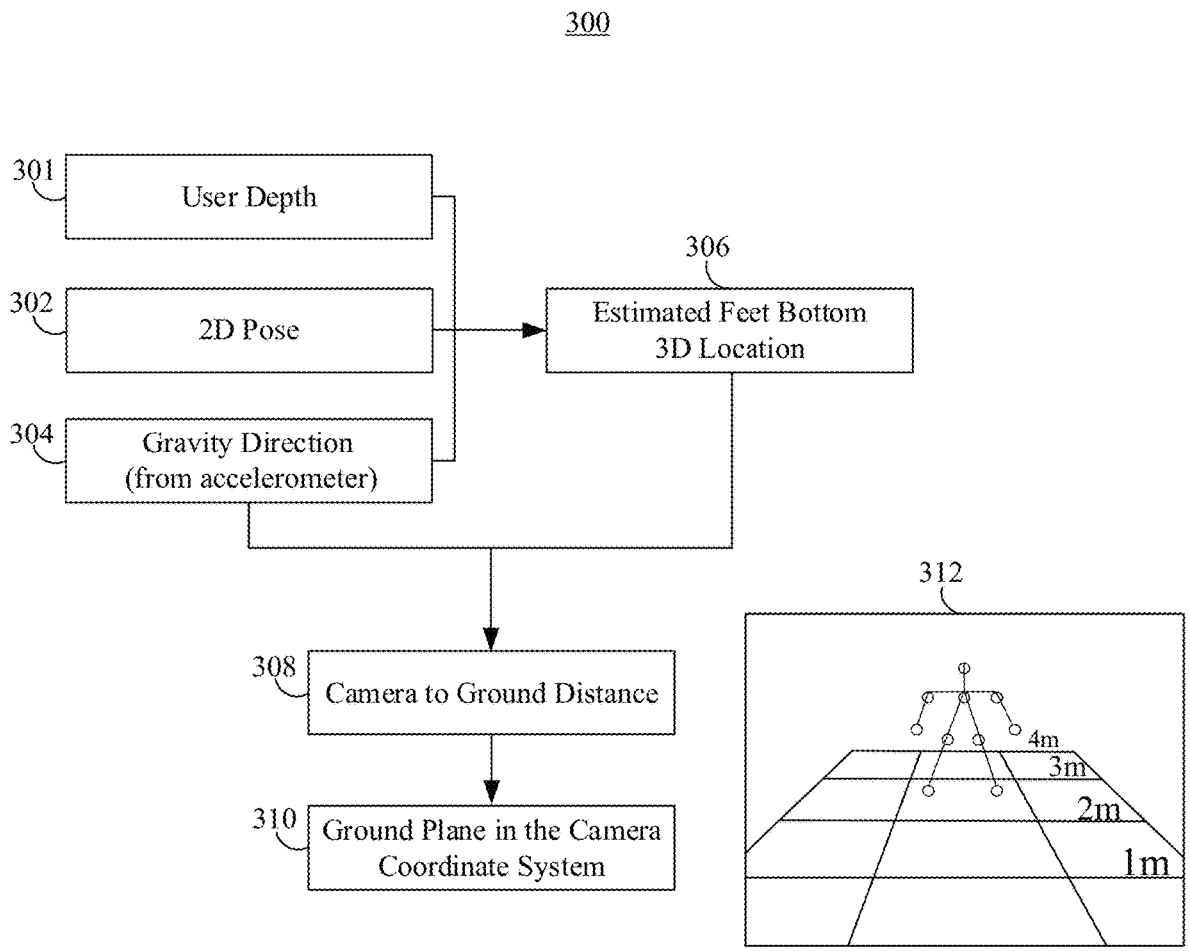
FIG. 3 is an exemplary flow chart illustrating example operations for determining a ground plane in a camera coordinate system with respect to a given user in an environment, in accordance with example embodiments of the present invention.

According to the procedure generally described above, the disclosed systems can determine an estimated depth from a height of the user. Further, given a ground truth height of the user, for example provided by user input, the disclosed systems can perform a binary search of the depth as described above to obtain a more accurate estimate of the user's real-world depth. As noted above, the disclosed systems can randomly predict a user's depth, use the predicted depth to compute a predicted height of the person, compare the predicted height with user's real height. If the predicted height is too large, the disclosed systems can determine that the predicted depth is too large, and can reduce the predicted depth and continue predicting and checking the depth using the binary search process, which can lead to a more and more accurate guessed depth FIG. 3 is an exemplary flow chart 300 illustrating some example operations for determining a ground plane in a camera coordinate system with respect to a given user in an environment (shown schematically at 312), in accordance with example embodiments of the present invention. In some embodiments, the disclosed systems can estimate the ground plane based on the determined depth of user. Again, the disclosed systems may not need to compute the user's height because the user's height has already been obtained (e.g., from user input). In some examples, the computation of the predicted user height from a predicted depth can merely be performed as a step of the binary search for computing an accurate estimated user depth. Further, the disclosed systems can compute the ground plane for certain applications that require the determination of the ground plane. For example, the disclosed systems can be configured to determine a three-dimensional ray from the user's 2D feet location and intersect the three-dimensional ray with a ground plane to determine the user's bird-eye view location. Further, the disclosed systems can also render some AR objects on the ground based on the determination of the ground plane. It will be appreciated by one of ordinary skill in the art that the above-mentioned applications are non-limiting and are merely provided as examples.

In particular, the disclosed systems can determine the user's depth 301 as described in connection with FIG. 2, above. Further, the disclosed systems can determine the 2D pose 302 of the user by the machine learning algorithm and machine vision algorithm from one or more images captured by the camera of the device. As further noted, the disclosed systems can determine the direction of gravity 304 (e.g., the gravity vector) from the accelerometer of the user's device (e.g., mobile phone). In some examples, the direction of gravity, the 2D pose of the user, and the user depth can be used by the disclosed systems to estimate the bottom of the user's feet 306 in the location of the user in the user's three-dimensional environment. Further, the estimated bottom of the user's feet 306 can be used in combination with the determined direction of gravity to determine the distance between the camera of the user's device and the ground 308. From the distance between the camera and the ground 308, the disclosed systems can determine a ground plane in the camera's coordinate system 310.

Figure 4:
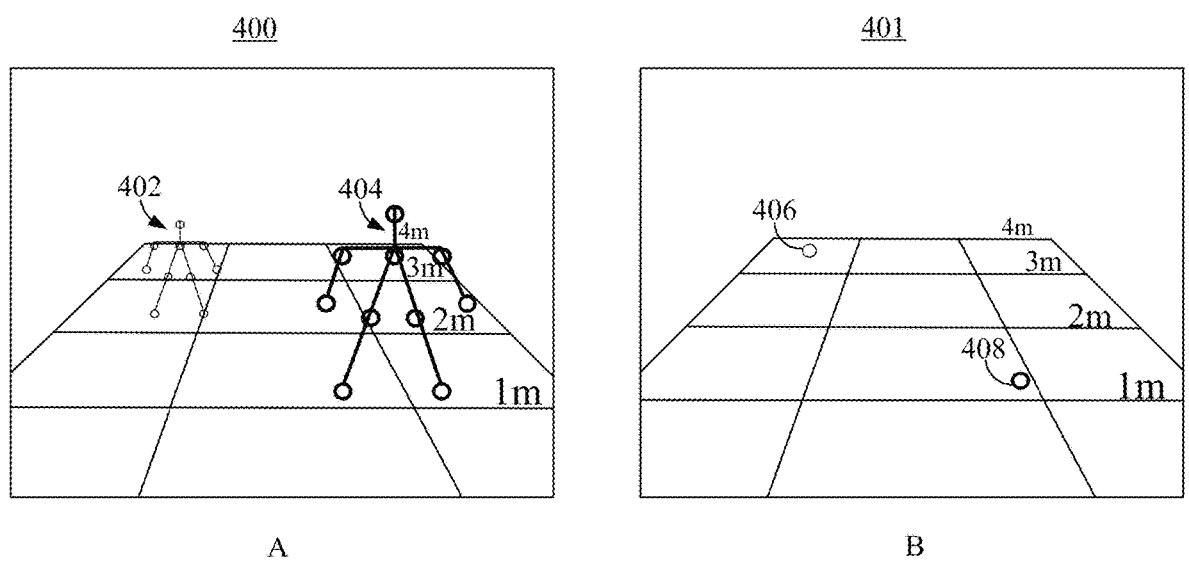
FIG. 4 is an exemplary schematic illustrating one approach of determining a given user's location in a three-dimensional representation of an environment from the perspective of a camera of a device, in accordance with example embodiments of the present invention.

FIG. 4 is an exemplary schematic illustrating one approach of determining a given user's location in a three-dimensional representation of an environment from the perspective of the camera of a device, in accordance with example embodiments of the present invention. In particular, the disclosed systems can determine the user's location using a first approach in which the disclosed systems determine and/or check the ground location(s) corresponding to the user's location. This approach may also be suitable for determining the locations of multiple users. In particular, as shown in FIG. 4 (part 400), a user can be represented via a pose in the image at one or more locations (e.g., poses 402 and 404). As shown in FIG. 4 (part 401), the disclosed systems can determine corresponding ground locations 406 and 408 associated with user's poses by determining a ray-plane intersection (e.g., determining the intersection of a ray representing the user and a plane representing the ground in the three-dimensional space) in the camera's coordinate system. More precisely, the disclosed systems can compute the three-dimensional ray from the user's feet location in 2D, similar to how systems can project three-dimensional scene to images through a camera.

Figure 5A:
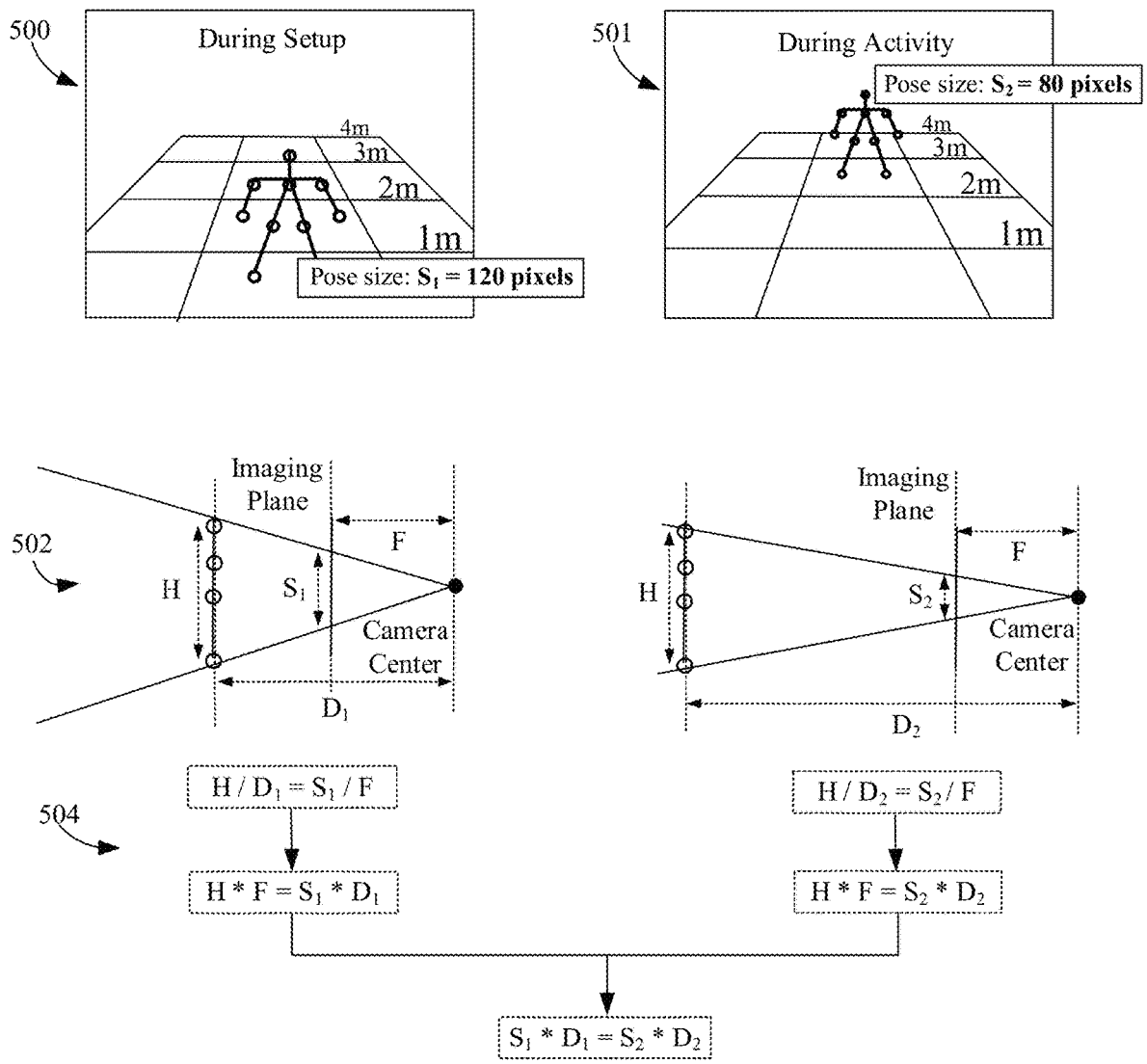
FIG. 5A is an exemplary schematic illustrating a technique of determining a given user's depth with respect to the camera of the device during a setup and activity phase, in accordance with example embodiments of the present invention.

FIG. 5A is an exemplary schematic illustrating a technique of determining a given user's depth with respect to the camera of the device during a setup (e.g., calibration) and activity phase, in accordance with example embodiments of the present invention. In particular, the disclosed systems can determine the user's location using an approach in which the disclosed systems determine the user's depth from the camera using the user's pose size in image(s) of the user taken by the camera. Such an approach may be more suitable in situations in which the users are not standing on the ground (e.g., jumping) and/or the ground is not visible to the camera (e.g., the device is positioned on ground itself). As shown in FIG. 5A, the disclosed systems can determine a first pose size during a setup (e.g., $S_1$) 500 operation and a second pose size during a user's activity (e.g., $S_2$) 501 stage. Then, as shown in diagrams 502, using information such as a camera's center, the distance to the imaging plane (F), and the depths of the user during setup ($D_1$) along with the user's height (H) and the first and second pose sizes ($S_1$ and $S_2$), the user's depth during a given activity ($D_2$) can be determined as shown and described in connection with diagram 504, described below.

In some examples, the disclosed systems can determine the pose size as a number based on the image pixel length of the pose limbs associated with pose model of the user. More specifically, the limb can represent a segment between two joints in the image, and the segment can have a length which can be represented by a number of pixels for the unit system (e.g., since the length is based on an image and not actual real-life measurement). In other aspects, the disclosed systems can determine a more robust location of a given user from noisy input (e.g., noisy pose detection data), by applying any suitable filter technique such as a temporal smoothing technique on the user's locations. In another embodiment, the disclosed systems can perform, for multi-user use cases, a calibration and/or setup step for each user. Additionally, some visual features (e.g., clothing and/or skin colors and/or jersey, face, or other body part identifying information) associated with the users can be saved during the setup step and used to distinguish different users during subsequent activities.

As indicated in diagram 504, the formula $S_1*D_1=S_2*D_2$ can be shown to hold mathematically and be used to determine any given variable of the four variables if the other three variables are known. In the formula above, $S_1$ can refer to the height of the person on the image during setup (with units of pixels) during setup, and $S_2$ can refer to the height of the person on the image during the activity (with units of pixels). Further, $D_1$ can refer to the distance between the camera center and the user during setup, and $D_2$ can refer to the distance between the camera center and the user the activity. In particular, $S_1$ and $S_2$ can be determined from the image detection during the setup stage and can also be determined during the user's activity. Further, $D_1$ can be determined by the system during the setup stage (e.g., as noted above, by performing a depth by binary search operation). Accordingly, $D_2$ may be the unknown variable in the equations representing the configuration, and the disclosed systems can determine $D_2$ using the formula $S_1*D_1=S_2*D_2$. Once $D_2$ (the depth) is known, the disclosed systems can compute the three-dimensional location of all the key points associated with the pose of the user (assuming the user's key points are on the same plane, which is normally the case). Accordingly, with the three-dimensional locations of pose key points, the disclosed systems can determine the real-world height of the user's body including the height of certain portions of the user's body such as the user's hip, chest, and/or shoulders. Therefore, the disclosed systems can this information to further determine whether the user is in a given position (e.g., a jumping and/or squatting position), for example, by noting particular arrangements or patterns of the key points of the representation of the user's body.

Figure 5B:
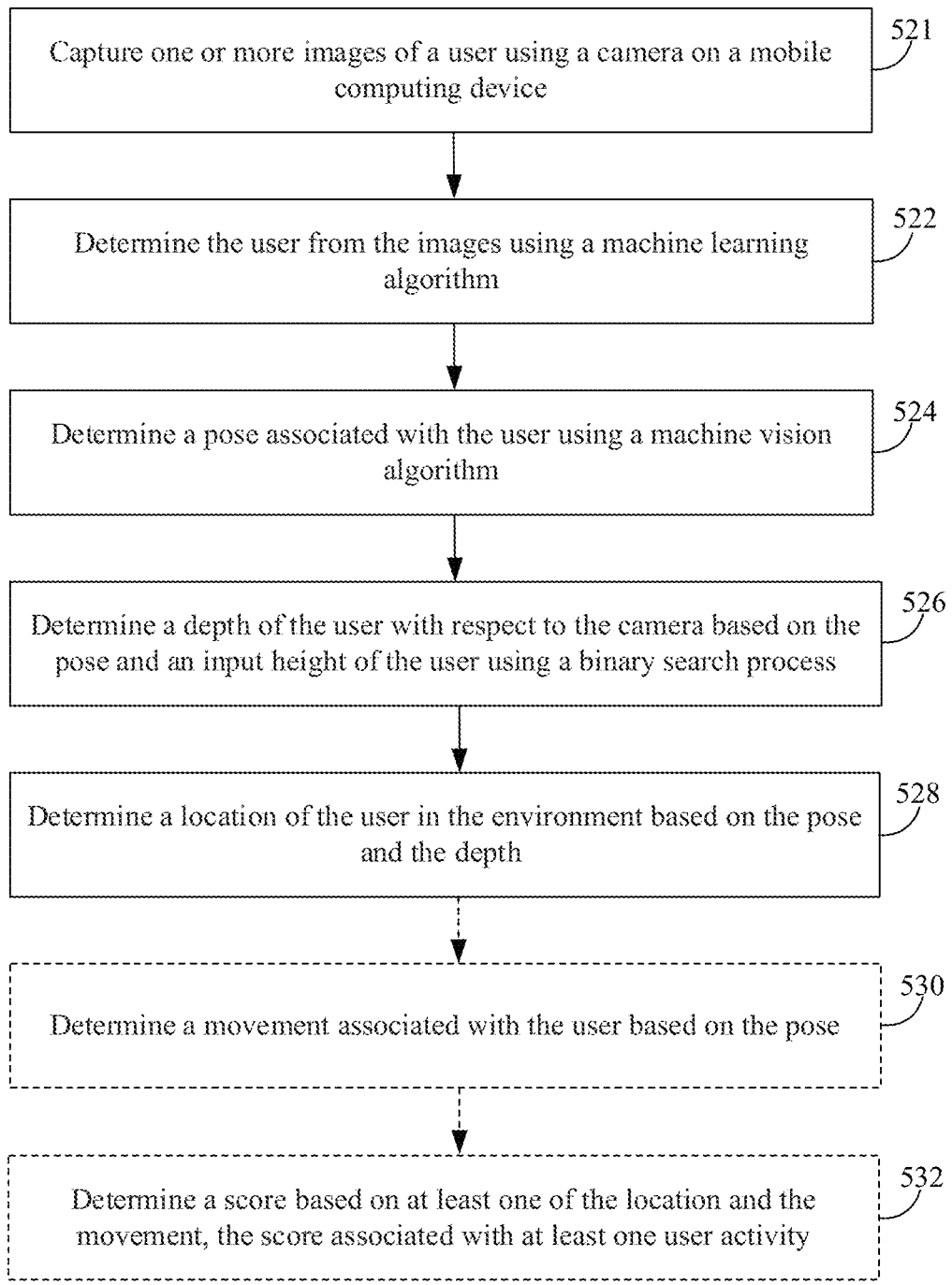
FIG. 5B is an illustration of an exemplary flow chart illustrating example operations for performing location determination, in accordance with example embodiments of the present invention.

FIG. 5B is an illustration of an exemplary flow chart 520 illustrating example operations for performing location determination, in accordance with example embodiments of the present invention. In particular, at block 521, the disclosed systems can be configured to capture one or more images of a user using the camera on the mobile computing device. At block 522, the disclosed systems can be configured to determine the user from the images using a machine learning algorithm. At block 524, the disclosed systems can be configured to determine a pose associated with the user using a machine vision algorithm. At block 526, the disclosed systems can be configured to determine a depth of the user with respect to the camera based on the pose and an input height of the user using a binary search process. At block 528, the disclosed systems can be configured to determine the location of the user in the environment based on the pose and the depth. Optionally, at block 530, the disclosed systems can be configured to determine a movement associated with the user based on the pose. Finally, optionally, at block 532, the disclosed systems can be configured to determine a score based on at least one of the location and the movement, the score associated with at least one user activity.

Figure 6:
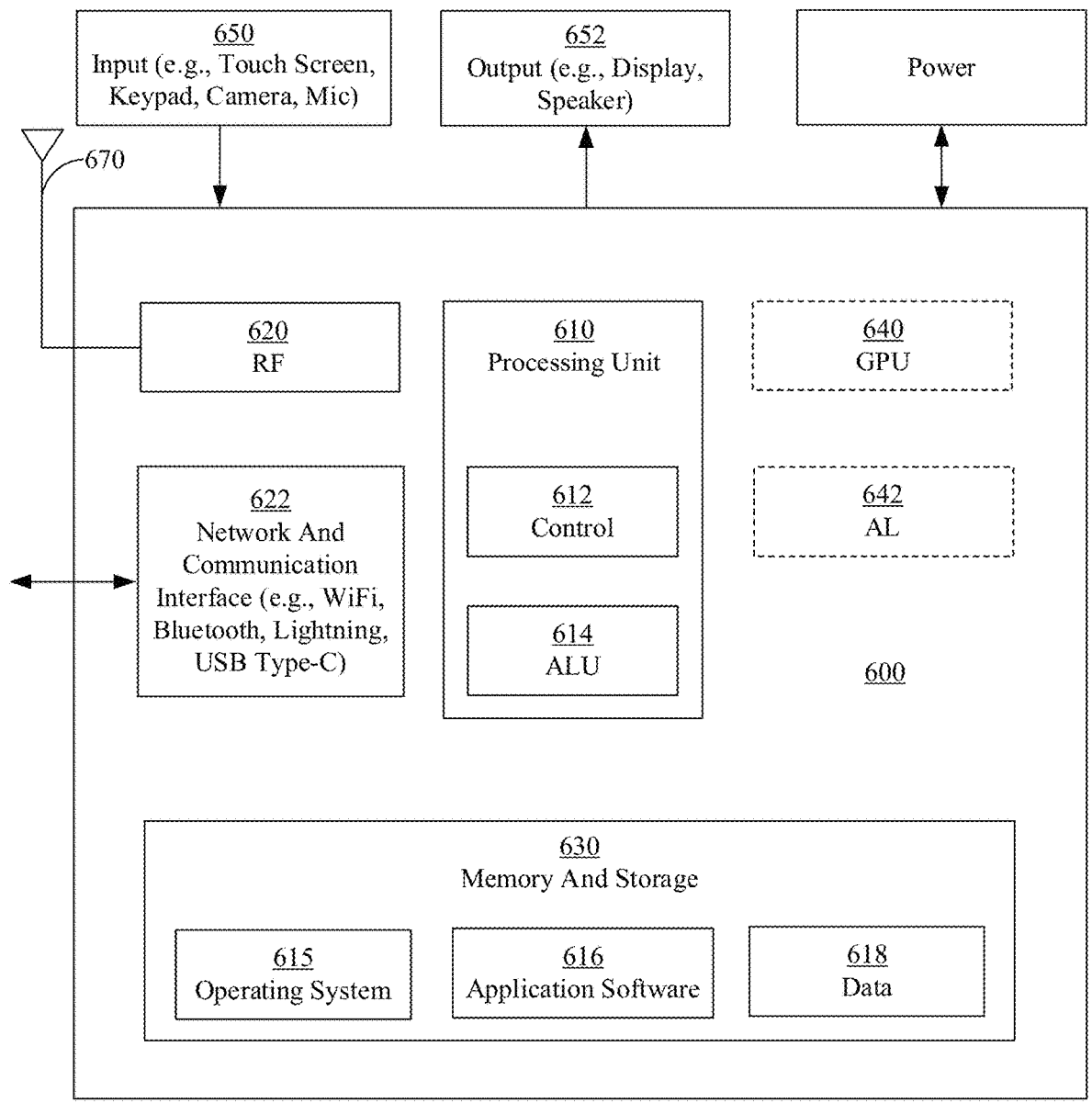
FIG. 6 is an exemplary schematic diagram of a user computing entity for implementing a user location and movement determination system, according to exemplary embodiments of the present invention.
Figure 7:
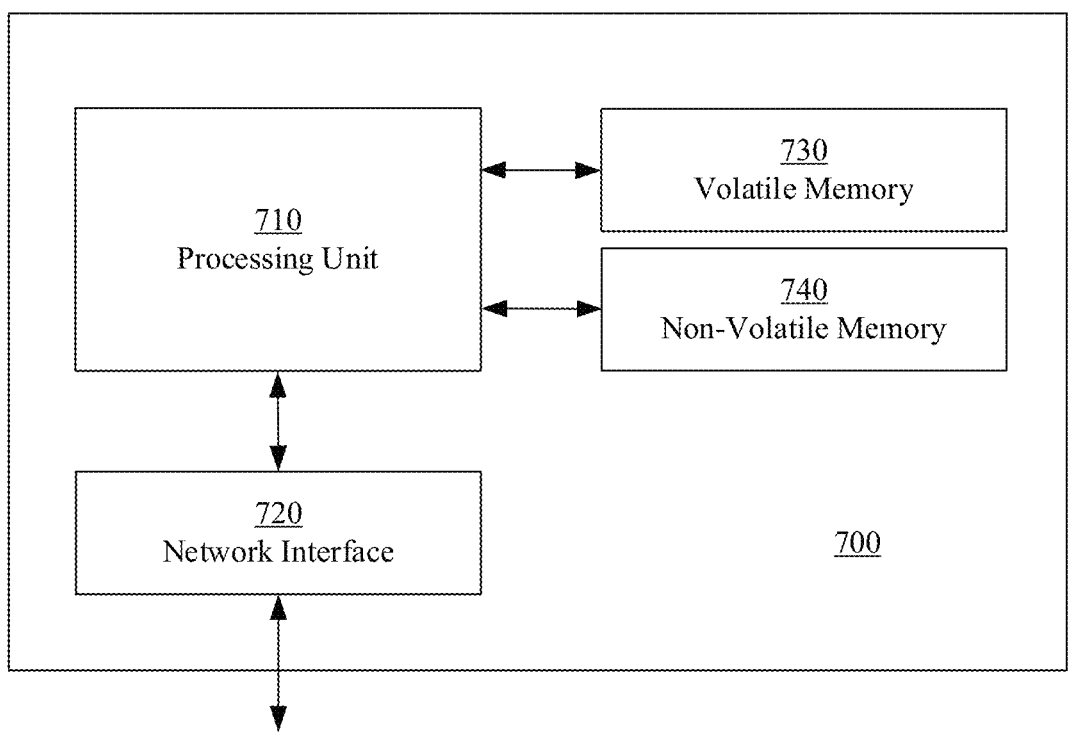
FIG. 7 is an exemplary schematic diagram of a management computing entity for implementing a user location and movement determination system, according to exemplary embodiments of the present invention.

Implementation Using Computer Program Products, Methods, and Computing Entities
Exemplary System Architecture An exemplary embodiment of the present disclosure may include one or more user computing entities 600, one or more networks, and one or more server or management computing entities 700, as shown in FIGS. 6 and 7. Each of these components, entities, devices, systems, and similar words used herein interchangeably may be in direct or indirect communication with, for example, one another over the same or different wired or wireless networks. Additionally, while FIGS. 6 and 7 illustrate the various system entities as separate, standalone entities, the various embodiments are not limited to this particular architecture.

Exemplary User Computing Entity

FIG. 6 is an exemplary schematic diagram of a user computing device for implementing a user location and movement determination system, according to exemplary embodiments of the present invention. A user operates a user computing device 600 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 600 may be a mobile device, and may be operated by a user participating in an interactive physical training activity. On the other hand, a server may be implemented according to the exemplary schematic diagram shown in FIG. 7, possibly in the cloud, and possibly with logically or physically distributed architectures.

As shown in FIG. 6, the user computing entity 600 may include an antenna 670, a radio transceiver 620, and a processing unit 610 that provides signals to and receives signals from the transceiver. The signals provided to and received from the transceiver may include signaling information in accordance with air interface standards of applicable wireless systems. In this regard, the user computing entity 600 may be capable of operating with one or more air interface standards, communication protocols, modulation types, and access types. More particularly, the user computing entity 600 may operate in accordance with any of a number of wireless communication standards and protocols. In some embodiments, user computing entity 600 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 600 may operate in accordance with multiple wired communication standards and protocols, via a network and communication interface 622.

Via these communication standards and protocols, the user computing entity 600 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 600 can also download changes, add-ons, and updates, for instance, to its firmware, software (e.g., including executable instructions, applications, program modules), and operating system.

In some implementations, processing unit 610 may be embodied in several different ways. For example, processing unit 610 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 610 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 610 may be configured for a particular use or configured to execute instructions stored in volatile or non-volatile media or otherwise accessible to the processing unit. As such, whether configured by hardware or computer program products, or by a combination thereof, processing unit 610 may be capable of performing steps or operations according to embodiments of the present invention when configured accordingly.

In some embodiments, processing unit 610 may comprise a control unit 612 and a dedicated arithmetic logic unit 614 (ALU) to perform arithmetic and logic operations. In some embodiments, user computing entity 600 may optionally comprise a graphics processing unit 640 (GPU) for specialized image and video rendering tasks, and/or an artificial intelligence (AI) accelerator 642, specialized for applications including artificial neural networks, machine vision, and machine learning. In some embodiments, processing unit 610 may be coupled with GPU 640 and/or AI accelerator 642 to distribute and coordinate processing tasks.

In some embodiments, user computing entity 600 may include a user interface, comprising an input interface 650 and an output interface 652, each coupled to processing unit 610. User input interface 650 may comprise any of a number of devices or interfaces allowing the user computing entity 600 to receive data, such as a keypad (hard or soft), a touch display, a mic for voice/speech, and a camera for motion or posture interfaces. User output interface 652 may comprise any of a number of devices or interfaces allowing user computing entity 600 to provide information to a user, such as through the touch display, or a speaker for audio outputs. In some embodiments, output interface 652 may connect user computing entity 600 to an external loudspeaker or projector, for audio or visual output.

User computing entity 600 may also include volatile and/or non-volatile storage or memory 630, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 615, application software 616, data 618, databases, database instances, database management systems, programs, program modules, scripts, source code, object code, byte code, compiled code, interpreted code, machine code, executable instructions, and/or the like to implement the functions of user computing entity 600. As indicated, this may include a user application that is resident on the entity or accessible through a browser or other user interface for communicating with a management computing entity and/or various other computing entities.

In some embodiments, user computing entity 600 may include location determining aspects, devices, modules, functionalities, and/or similar words used herein interchangeably. For example, user computing entity 600 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 600 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In a training session for use in connection with the user location and movement determination system described herein, a user computing entity 600 may be deployed (e.g., installed; configured; accepted; installed and accepted; configured and accepted; installed, configured, and accepted; or the like) in a training area that includes players and/or game equipment. In some embodiments, at least one input device on user computing entity 600 may collect or may be configured to collect information (e.g., data, metadata, and/or signaling) indicative of operational features of the training area and/or equipment for analysis by processing unit 610. For example, computer vision algorithms as implemented on user computer entity 600 may be configured to detect the location of users in addition to various aspects of the environment and/or objects in the environment including, but not limited to, court lines, field boundaries, one or more balls, or goal posts in an input video as captured by an input camera device.

In some embodiments, a system for user location and movement determination may include at least one user computing device such as a mobile computing device and optionally a mounting apparatus for at least one mobile computing device. The mounting apparatus may be a tripod or a kickstand, and may mount the electronic device with a camera of the user computing device positioned to monitor a training area. In some embodiments, the user computing device may be hand-held or put on the ground leaning against certain articles such as a water bottle. In some embodiments, the system for user location and movement determination further comprises a sound device, for example, earbuds (e.g., wireless earbuds) or a speaker system (e.g., a public address (PA) system) coupled to the at least one user computing device. The sound device may serve to provide instruction and feedback regarding the certain aspects such as calibration of the user location and movement determination system and/or a training session to the user. In some embodiments, the system optionally comprises an optical device such as a projector, a projection lamp, a laser pointing system, a jumbotron, a television screen, or the like, that can facilitate an interactive training session. For example, a laser pointing system may point to a location in the training area to direct the user to position himself or herself, or it may point to a location in a display of the training video as the visual cue, to direct the user to perform a desired set of physical movements.

In some embodiments, user computing entity 600 may communicate to external devices like other smartphones and/or access points to receive information such as software or firmware, or to send information (e.g., location data, movement data, event data, training data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. At least two of the users may be in geographically different training areas. In some embodiments, the user computing devices may use a network interface such as 622 to communicate with various other computing entities, such as by communicating data, content, information, and/or similar terms used herein interchangeably that can be transmitted, received, operated on, processed, displayed, stored, and/or the like.

In some embodiments, data such as location, movement, and event data, and training statistics, scores, and videos may be uploaded by one or more user computing devices to a server such as shown in FIG. 7 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, artificial intelligence-based computer vision algorithms may be used to perform at least one of the following: (i) ensure that users are located where they should be, (ii) determine the users' motion/action, and (iii) determine when/if users successfully complete a task (e.g., a calibration task).

In various embodiments, during the physical activities performed by users, the mobile computing device may not be on the user's person, and instructions may be given via a speaker or other remote devices connected to the mobile device. Further, computer vision algorithms may be used on the mobile device to guide and monitor motion, movements, and/or training being conducted within the mobile device camera's field of view. Accordingly, embodiments of devices described herein can employ artificial intelligence (AI) to facilitate automating one or more training features of functionalities as described herein.

To provide for or aid in the numerous determinations (e.g., determine, ascertain, infer, calculate, predict, prognose, estimate, derive, forecast, detect, compute) of training settings, player postures and player analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, calibration instructions and feedbacks to users may be generated from data derived from user previous movements and/or camera positioning. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 7 is an exemplary schematic diagram of a management computing entity 700, such as NEX server, for implementing a virtual coaching and performance training system, according to exemplary embodiments of the present invention. The terms computing entity, computer, entity, device, system, and/or similar words used herein interchangeably are explained in detail with reference to user computing entity 600.

As indicated, in one embodiment, management computing entity 700 may include one or more network or communications interface 720 for communicating with various computing entities, such as by communicating data, content, information, and/or similar terms used herein interchangeably that can be transmitted, received, operated on, processed, displayed, stored, and/or the like. For instance, management computing entity 700 may communicate with user computing device 600 and/or a variety of other computing entities. Network or communications interface 720 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 700 may be configured to communicate via wireless external communication networks using any of a variety of standards and protocols as discussed with reference to user computing device 600.

As shown in FIG. 7, in one embodiment, management computing entity 700 may include or be in communication with one or more processing unit 710 (also referred to as processors, processing circuitry, processing element, and/or similar terms used herein interchangeably) that communicate with other elements within the management computing entity 700. As will be understood, processing unit 710 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 710 may be configured for a particular use or configured to execute instructions stored in volatile or non-volatile media 730 and 740. As such, whether configured by hardware or computer program products, or by a combination thereof, processing unit 710 may be capable of performing steps or operations according to embodiments of the present disclosure when configured accordingly.

Although not shown explicitly, management computing entity 700 may include or be in communication with one or more input elements, such as a keyboard, a mouse, a touch screen/display, a camera for motion and movement input, a mic for audio input, a joystick, and/or the like. Management computing entity 700 may also include or be in communication with one or more output elements such as speaker, screen/display, and/or the like.

In various embodiments, one or more of the components of management computing entity 700 may be located remotely from other management computing entity components, such as in a distributed system or in the cloud. Furthermore, one or more of the components may be combined and additional components performing functions described herein may be included in the management computing entity 700.

Machine Vision and Machine Learning Modules

As described herein, embodiments of the present invention use one or more artificial intelligence, machine vision, and machine learning algorithms or modules for determining the location of the user, determining the pose of the user in an environment, and determining movement patterns associated with the user in the environment. Various exemplary machine vision algorithms are within the scope of the present invention used for performing object recognition, gesture recognition, pose estimation, and so forth. The following description describes in detail some illustrative machine vision and machine learning algorithms for implementing some embodiments of the present invention.

Some exemplary machine vision algorithms utilize a deep learning network (DLN), for example a convolutional neural network (CNN). Neural networks are computer systems inspired by the biology of the human brain. They can be viewed as parallel, densely interconnected computational models that adaptively learn through automatic adjustment of system parameters based on training data. Input information is modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks utilize the process of convolution to reduce the number of model parameters involved, while successfully capturing the spatial and temporal dependencies in an image.

Illustrative NEX Platform

Figure 8:
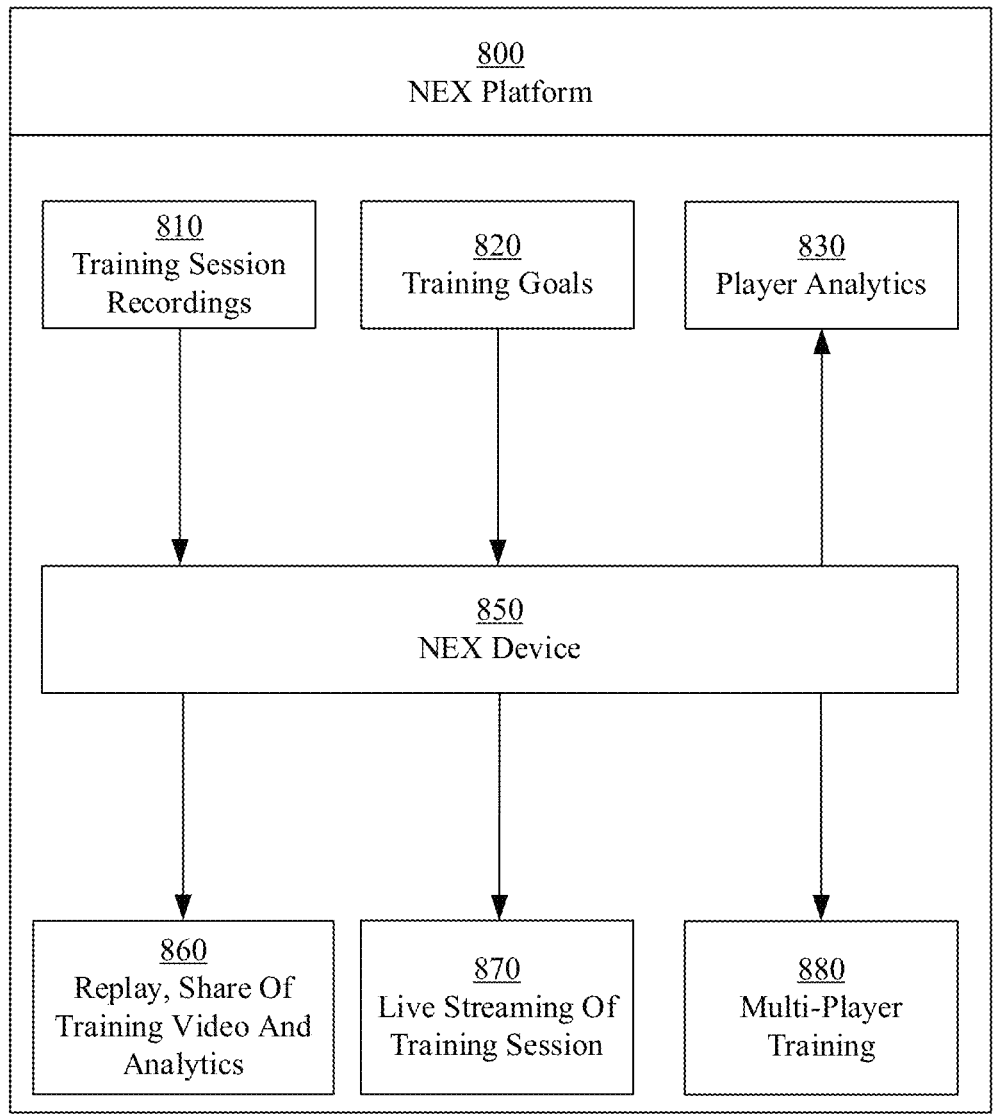
FIG. 8 is a schematic diagram illustrating an exemplary NEX platform, according to exemplary embodiments of the present invention.

FIG. 8 is a schematic diagram illustrating and summarizing some functionalities provided by an extended NEX platform 800, according to one embodiment of the present invention. In particular, a NEX device 850 may take in training goals 820, and facilitate different types of training activities, optionally generating player analytics 830, providing live streaming 870 of training sessions, and enable the replay and share 860 of training video and analytics. NEX platform 800 may also receive training session recordings 810, for local analysis to generate training analytics or statistics.

In some embodiments, NEX platform 800 also enables multi-player training processes 880, where multiple users located at the same or geographically different training areas may train at the same time or asynchronously, using a single mobile computing device or multiple mobile computing devices.

Although NEX device 850 as shown in FIG. 8 serves as the core for a NEX platform 800, in some embodiments such as in multi-player training, NEX platform 800 may be networked among multiple user devices, where a NEX server implemented according to the embodiment shown in FIG. 7 may be connected to multiple camera-enabled user computing devices implemented according to the embodiment shown in FIG. 6, and each used to capture user locations and movements over time, physical training data, and for providing player analytics. Such data may be uploaded to the NEX server, which in term may store and facilitate sharing of such data among individual players/users and teams.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device, as illustrated in FIGS. 6 and 7, is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method for performing location and movement determination in a three-dimensional environment using a computing device having a camera, comprising:
    capturing an image of a user using the camera of the computing device;
    identifying the user from the image using a first algorithm;
    determining a first physical information, the first physical information comprising a noisy pose data of the user, using a second algorithm;
    applying a filter to the noisy pose data to generate a filtered first physical information;
    determining a second physical information, the second physical information comprising a depth of the user with respect to the camera, based on the first physical information and an input parameter of the user using a search process; and
    determining the location of the user in the environment based on the filtered first physical information and the second physical information.

2. The computer-implemented method of claim 1, further comprising:
    determining a first pose size of the user from a first user pose and determining a second pose size of the user from a second user pose; and
    determining the depth based on one or more of the camera's center, a distance to an imaging plane, an input height of the user, the first pose size, and the second pose size.

3. The computer-implemented method of claim 2, further comprising:
    determining the first pose size based on a length of pose limbs associated with the first user pose.

4. The computer-implemented method of claim 1, further comprising:
    determining a movement associated with the user based on the first physical information.

5. The computer-implemented method of claim 1, further comprising:
    determining a direction of gravity using the computing device;
    determining a second location of a portion of the user's body in the three-dimensional environment; and
    determining, based on the second location, a distance between the camera and the second location.

6. The computer-implemented method of claim 5, further comprising:
    determining, based on the second physical information, a reference plane in the camera's coordinate system.

7. A non-transitory storage medium for performing location and movement determination in a three-dimensional environment using a computing device having a camera, the storage medium comprising machine-readable program code that cause a processor to:
- capture an image of a user using the camera of the computing device;
- identify the user from the image using a first algorithm;
- determine a first physical information, the first physical information comprising a noisy pose data of the user, using a second algorithm;
- apply a filter to the noisy pose data to generate a filtered first physical information;
- determine a second physical information, the second physical information comprising a depth of the user with respect to the camera, based on the first physical information and an input parameter of the user using a search process; and
- determine the location of the user in the environment based on the filtered first physical information and the second physical information.

8. The non-transitory storage medium of claim 7, further comprising program code to:
- determine a first pose size of the user from a first user pose and determine a second pose size of the user from a second user pose; and
- determine the depth based on one or more of the camera's center, a distance to an imaging plane, an input height of the user, the first pose size, and the second pose size.

9. The non-transitory storage medium of claim 7, further comprising program code to:
- determine a movement associated with the user based on the first physical information.

10. The non-transitory storage medium of claim 7, further comprising program code to:
- determine a direction of gravity using the computing device;
- determine a second location of a portion of the user's body in the three-dimensional environment; and
- determine, based on the second location, a distance between the camera and the second location.

11. The non-transitory storage medium of claim 10, further comprising program code to:
- determine, based on the second physical information, a reference plane in the camera's coordinate system.

12. A computing device for performing location and movement determination in a three-dimensional environment, comprising:
- a camera device;
- a processor; and
- a non-transitory memory storing program code thereon, the program code executable by the processor to:
  - capture an image of a user using the camera device of the computing device;
  - identify the user from the image using a first algorithm;
  - determine a first physical information, the first physical information comprising a noisy pose data of the user, using a second algorithm;
  - apply a filter to the noisy pose data to generate a filtered first physical information;
  - determine a second physical information, the second physical information comprising a depth of the user with respect to the camera device, based on the first physical information and an input parameter of the user using a search process; and
  - determine the location of the user in the environment based on the filtered first physical information and the second physical information.

13. The computing device of claim 12, further comprising program code to:
- determine a first pose size of the user from a first user pose and determining a second pose size of the user from a second user pose; and
- determine the depth based on one or more of the camera device's center, a distance to an imaging plane, an input height of the user, the first pose size, and the second pose size.

14. The computing device of claim 12, further comprising program code to:
- determine a direction of gravity using the computing device;
- determine the location of a portion of the user's body in the three-dimensional environment; and
- determine, based on the location, a distance between the camera device and the location.

15. The computing device of claim 14, further comprising program code to:
- determine, based on the second physical information, a reference plane in the camera device's coordinate system.

* * * * *